July 27, 1954   F. DICK   2,684,657
SWINE HANDLING DEVICE
Filed Dec. 13, 1951
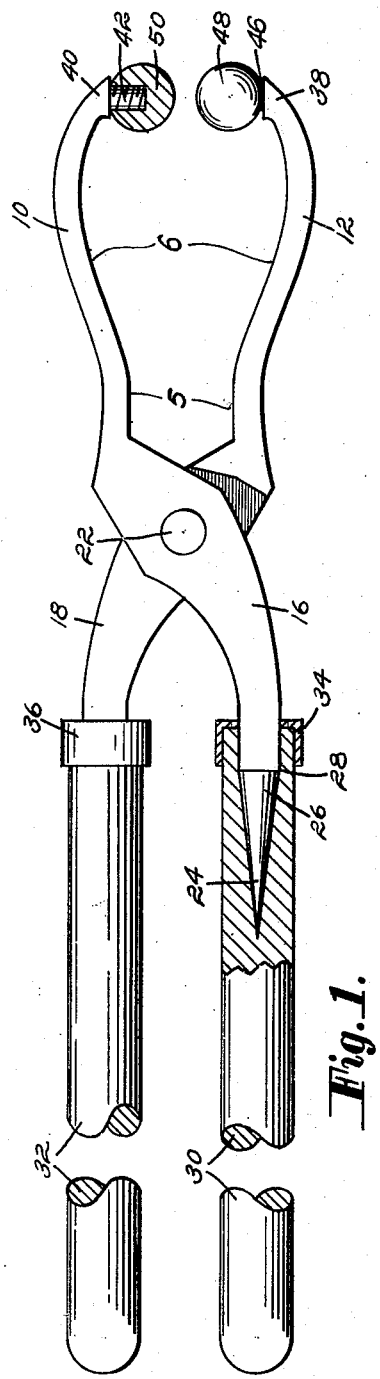
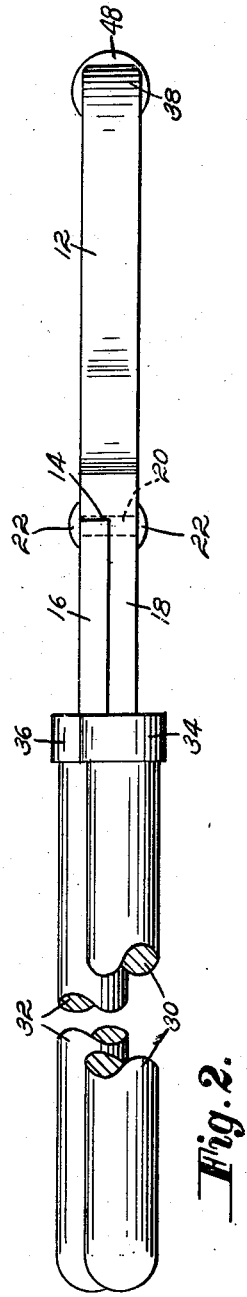
Inventor
FRANCIS DICK
By Arthur H. Sturges
Attorney Patented July 27, 1954

2,684,657

UNITED STATES PATENT OFFICE 2,684,657

SWINE HANDLING DEVICE

Francis Dick, Sabetha, Kans.

Application December 13, 1951, Serial No. 261,421

2 Claims. (Cl. 119—154)

The instant invention relates to animal husbandry and more particularly to swine.

It is an object of the invention to provide a device for capturing and holding swine.

Another object of the invention is to provide a device a portion of which may be inserted into the mouth of a hog or a pig for the said purpose and to provide a device which is so constructed that the hazard of injury to the comparatively tender mouth of an animal is substantially eliminated.

An important object of the invention is to provide a device for the foregoing stated purposes the parts of which are interchangeable for use in the mouth of a comparatively large hog or the smaller mouth of a young pig as may be selected.

A further object of the invention is to provide a device which may be applied around the snout of a swine or a portion of the device applied within the mouth of the animal as may be desired.

A still further object of the invention is to provide such guards on the terminal ends of the jaws of the device that injury to the skin or the like of an animal is prevented during use.

Other and further objects and advantages of the invention will be understood from the following detailed description thereof reference being had to the accompanying drawing in which:

Figure 1 is a top plan view of the new device certain portions thereof being broken away and others appearing in section.

Figure 2 is a side view of the device shown in Figure 1.

Figure 3 is a transverse section of a guard-ball employed.

Figure 4 is a side view of a ball such as or similar to the ball shown in Figure 3.

Referring now to the drawing for a more particular description the new device includes a pair of oppositely disposed jaws 10 and 12 having a later described special shape. The jaw 12 is step cut, as shown at 14, in Figure 2 so that the portion 16 of the similarly step cut jaw 10 will be disposed within the longitudinal plane of the jaw 12. The latter has a portion 18 which abuts the portion 16 as shown in Figure 2 and a rivet 20 is employed for pivotally connecting said abutted portions together. Preferably both ends of the rivet 20 are provided with like peened heads 22. The portion 16 is preferably provided with an acutely pointed terminal end portion 24 as best shown in Figure 1, and it will be understood that the portion 18 of the jaw 12 is also preferably so shaped whereby, at times when, the shank portion 26 of the portion 16 is inserted into the suitable aperture 28 of an elongated wooden handle 30 the said pointed end 24 engages adjacent portions of the wood for locking said handle to the shank 26.

At times when the wooden handles 30 and 32 are employed the reinforcing like ferrules 34 and 36 are respectively attached to and around the ends of the wooden handles as shown.

If desired in lieu of the wooden handles 30 and 32 the said shanks may be provided of a length equivalent to the length of the said handles. However, it has been found that in actual practice and for certain uses that the said wooden handles are preferable.

Adjacent to the terminal ends 38 and 40 of the jaws 12 and 10 respectively each of said ends are provided with the like threaded studs 42 and 46 which are disposed toward each other. The studs are for threadedly engaging the globular members or balls 48 and 50 in a manner whereby the said members may be readily detached from their respective studs for purposes later described.

Referring to Figures 3 and 4 the new device further includes at least two more balls 52 and 54 each thereof being provided with a recess 56 having a thread 58 disposed on the inner annular wall thereof.

As shown in Figure 1, the jaws 10 and 12 are elongated, comparatively thin and arcuate in plan for engagement around the snout of a swine or the like. Also at times when chance so requires during the capture of a hog, the balls on the terminal ends of the jaws may engage between the upper and lower jaws of the said hog, the other portions of the device, at this time, being primarily disposed above and forwardly of the head of the hog, and it will be seen that since the ball-guards are carried on the terminal ends of the jaws of the device that injury to the lips and skin of the head of the hog's torso is obviated. Also during the capture of a hog, should chance so require, one of the said balls may be inserted in the mouth of the hog and the other ball caused to firmly engage with the adjacent exterior portion of the hog's mouth or jaw and without damage to the hog. For use in connection with a capture of a large animal, the balls 48 and 50 are employed. For operating on a small animal, such as a pig, the small balls 52 and 54 are substituted for the balls 48 and 50. It has been found in actual practice that for certain operations and certain animals it is of advantage to employ one large ball and one small ball. Preferably, the said balls are detachable from their respective jaws and it will be understood that for certain operations and in connection with certain animals that, if desired, the said balls may be formed integral with the jaws 10 and 12. Said jaws have straight inner surfaces 5 located rearwardly of their arcuate forward inner surface portions 6, as shown in Figure 1.

In operation the handles 30 and 32 are respectively grasped in the hands of an operator and the tongs 10 and 12 maintained spread apart with respect to each other. The animal to be captured is then approached and either one of the tongs inserted in the mouth of the animal or around the animal's snout whereupon the operator causes said tongs to be moved toward each other in a manner whereby a portion of the mouth or snout of the animal is clamped between the balls 48 and 50. For small sized animals having small mouths the operation is the same except that the smaller size balls depicted in Figures 3 and 4 are substituted for the balls 48 and 50.

From the foregoing description it is thought to be obvious that a swine handling device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In an animal handling device of the character described, a pair of crossed elongated members, means pivotally connecting said members together at their crossed portions, whereby said members may pivot relative to each other in a common plane, respective elongated handles on said members rearwardly of their pivotal connection, respective jaws on said members forwardly of their pivotal connection, each jaw being of substantial length and comprising a longitudinally extending rear portion having a straight inner surface and an outwardly curved forward portion, the straight inner surfaces of the jaw rear portions being laterally offset in opposite directions from said pivotal connection, the outwardly curved forward portions of the jaws facing each other in opposition and being in said common plane, said outwardly curved forward portions being moved towards each other responsive to the movement of the handles towards each other, a threaded shank on the end of each of said forward portions, said shank extending substantially at right angles to the straight inner surface of the rear portion of its associated jaw, and a spherical ball threadedly engaged on said shank, the jaws being substantially of equal length, whereby the balls move toward abutting relationship with each other responsive to the movement of the handles towards each other.

2. In an animal handling device of the character described, a pair of crossed elongated members, means pivotally connecting said members together at their crossed portions, whereby said members may pivot relative to each other in a common plane, respective elongated handles on said members rearwardly of their pivotal connection, respective jaws on said members forwardly of their pivotal connection, each jaw being of substantial length and comprising a longitudinally extending rear portion having a straight inner surface and an outwardly curved forward portion, the straight inner surfaces of the jaw rear portions being laterally offset in opposite directions from said pivotal connection, the outwardly curved forward portions of the jaws facing each other in opposition and being in said common plane, said outwardly curved forward portions being moved towards each other responsive to movement of the handles towards each other and being shaped to engage around the snout of an animal, the handles being relatively close together when the straight inner surface of the rear portions of the jaws are parallel, whereby both handles may be grasped by a single hand of the user when said curved forward portions are engaged around the animal's snout, a threaded shank on the end of each of said forward portions, said shank extending substantially at right angles to the straight inner surface of the rear portion of its associated jaw, and a spherical ball threadedly engaged on said shank, the jaws being substantially of equal length, whereby the balls move toward abutting relationship with each other responsive to the movement of the handles towards each other.

References Cited in the file of this patent

UNITED STATES PATENTS

| Number | Name | Date |
|---|---|---|
| 13,672 | Welton | Oct. 9, 1855 |
| 98,625 | Phillips | Jan. 4, 1870 |
| 166,599 | Frederick | Aug. 10, 1875 |
| 215,972 | Pitts | May 27, 1879 |
| 611,744 | Tidler | Oct. 4, 1898 |
| 799,066 | Valle | Sept. 12, 1905 |
| 867,296 | Park | Oct. 1, 1907 |
| 1,768,011 | Sparks | Sept. 22, 1928 |
| 2,016,356 | Alberg | Sept. 30, 1933 |
| 2,052,371 | Tyler | Aug. 25, 1936 |
| 2,534,990 | Randolph | Nov. 21, 1947 |
| 2,595,432 | Wendt | May 6, 1952 |